(12) United States Patent
Utagawa (10) Patent No.: US 7,755,670 B2
(45) Date of Patent: Jul. 13, 2010

(54) TONE-CONVERSION DEVICE FOR IMAGE, PROGRAM, ELECTRONIC CAMERA, AND TONE-CONVERSION METHOD

(75) Inventor: Ken Utagawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 838 days.

(21) Appl. No.: 11/583,777

(22) Filed: Oct. 20, 2006

(65) Prior Publication Data

US 2007/0115369 A1    May 24, 2007

(30) Foreign Application Priority Data

Oct. 24, 2005    (JP)    ............................. 2005-308385

(51) Int. Cl.
| | | |
|---|---|---|
| H04N 5/235 | (2006.01) | |
| H04N 9/73 | (2006.01) | |
| H04N 9/68 | (2006.01) | |
| H04N 5/262 | (2006.01) | |
| H04N 5/208 | (2006.01) | |
| G06K 9/00 | (2006.01) | |
| G02B 5/12 | (2006.01) | |

(52) U.S. Cl. ................. 348/222.1; 348/223.1; 348/234; 348/239; 348/252; 382/167; 358/521

(58) Field of Classification Search .............. 348/222.1, 348/223.1, 239, 252, 225.1, 234, 237, 538, 348/E13.065, 63, 561, 208.6, 240.99, 240.1, 348/240.2, 644, 645, 650, 652, 675, 679, 348/688; 382/162, 167, 165, 260, 261, 262, 382/169, 237, 210, 264, 266, 300, 117–118, 382/181, 276; 358/3.01, 3.1, 3.27, 521, 525

See application file for complete search history.

(56) References Cited

U.S. PATENT DOCUMENTS

| 5,517,333 | A  * | 5/1996 | Tamura et al. | ............... | 358/518 |
|---|---|---|---|---|---|
| 7,127,122 | B2 * | 10/2006 | Ogata et al. | .................. | 382/260 |
| 7,146,042 | B2 * | 12/2006 | Chen | ........................... | 382/167 |
| 7,551,794 | B2 * | 6/2009 | Masuno et al. | ............... | 382/264 |
| 7,570,390 | B2 * | 8/2009 | Mitsunaga | ................... | 358/1.9 |
| 7,599,578 | B2 * | 10/2009 | Utagawa | ..................... | 382/276 |
| 7,631,026 | B2 * | 12/2009 | Kanai | .......................... | 708/270 |
| 2003/0156761 | A1 | 8/2003 | Ogata et al. | | |
| 2006/0062452 | A1 * | 3/2006 | Utagawa | ..................... | 382/162 |
| 2007/0053607 | A1 * | 3/2007 | Mitsunaga | ................... | 382/274 |
| 2008/0043120 | A1 * | 2/2008 | Mitsunaga | ................... | 348/238 |
| 2008/0085062 | A1 * | 4/2008 | Tsuruoka | ..................... | 382/284 |

(Continued)

*Primary Examiner*—Tuan Ho
*Assistant Examiner*—Marly Camargo
(74) *Attorney, Agent, or Firm*—Oliff & Berridge, PLC (57) ABSTRACT

The present invention relates to a tone-conversion device for converting a tone of an image having an achromatic signal and a chromatic signal, and it includes the following components: a signal extracting unit defining an achromatic signal of a first pixel or a second pixel from plural pixels as an achromatic signal value, the second pixel being in an immediate neighborhood; a neighborhood processing unit generating a local signal of the first pixel according to the achromatic signal and the chromatic signal of a third pixel contained in the neighborhood area which is larger than the second pixel; a gain determining unit determining a conversion gain for the first pixel according to the achromatic signal value and the local signal; and a tone conversion unit performing tone conversion by multiplying the signal component of the first pixel by the conversion gain.

16 Claims, 9 Drawing Sheets

U.S. PATENT DOCUMENTS

| | | | | |
|---|---|---|---|---|
| 2008/0199074 A1* | 8/2008 | Mitsunaga | .................. | 382/169 |
| 2008/0252791 A1* | 10/2008 | Mitsunaga | .................. | 348/673 |
| 2009/0097775 A1* | 4/2009 | Monobe et al. | ............. | 382/268 |
| 2009/0231467 A1* | 9/2009 | Yamashita et al. | .......... | 348/234 |
| 2009/0232401 A1* | 9/2009 | Yamashita et al. | .......... | 382/199 |
| 2009/0295937 A1* | 12/2009 | Sato et al. | ................ | 348/222.1 |

* cited by examiner

| REPRESENTATION | | ACHROMATIC COMPONENT | CHROMATIC COMPONENT |
|---|---|---|---|
| YCC | Y: Cr,Cb | Y (luminance luma) | Cr,Cb (chrominance chroma) |
| Lab | L: a,b | L (lightness) | a,b (chroma) |
| CIECAM | J: $a_C,b_C$ | J (lightness) | $a_C,b_C$ (chroma) |
| | Q: $a_M,b_M$ | Q (brightness) | $a_M,b_M$ (colorfulness) |
| IPT | I: P,T | I (lightness) | P,T (chroma) |

TONE-CONVERSION DEVICE FOR IMAGE, PROGRAM, ELECTRONIC CAMERA, AND TONE-CONVERSION METHOD

CROSS REFERENCE TO RELATED APPLICATION

The disclosure of the following related applications is incorporated herein by reference:

U.S. patent application Ser. No. 11/224,926, filed on Sep. 14, 2005

U.S. patent application Ser. No. 11/225,132, filed on Sep. 14, 2005

BACKGROUND OF THE INVENTION

1. Field of the Invention

The present invention relates to a tone-conversion device for image, program, an electronic camera, and a method thereof.

2. Description of the Related Art

U.S. patent Publication No. 20030156761 (hereinafter, referred to as Patent document 1) discloses a method of compressing a dynamic range by the following equation:

$$O[i,j] = I[i,j] \times F(R[i,j]) \ldots [100]$$

where $I[i,j]$ is a pixel value of an input image, $O[i,j]$ is a pixel value of an output image, $F(\ )$ is a coefficient calculation function, and $R[i,j]$ is a pixel value of the input image subjected to epsilon filtering. The epsilon filter is a nonlinear filter which nonlinearly extracts a small amplitude component from the input image and subtracts the small amplitude component from the input image.

The processing with the epsilon filter according to the Patent document 1 is complicated and time-consuming which causes a problem. On the other hand, the use of a simple low pass filter instead of the epsilon filter causes another problem of occurrence of a halo in a portion with a great luminance difference.

SUMMARY OF THE INVENTION

Therefore, it is an object of the present invention to generate with small processing load a conversion gain map suitable for a detailed tone adjustment.

Hereinafter, the present invention will be described.

<<1>> A tone-conversion device of the present invention converts a tone of an image generated from plural pixels having a signal component including an achromatic signal relating to brightness and a chromatic signal relating to color, and includes a signal extracting unit, a neighborhood processing unit, a gain determining unit, and a tone conversion unit.

The signal extracting unit extracts the achromatic signal of the first pixel or a second pixel from plural pixels as an achromatic signal value, the second pixel being in an immediate neighborhood of the first pixel.

The neighborhood processing unit generates a local signal of the first pixel according to the achromatic signal and the chromatic signal of a third pixel contained in a neighborhood area which is larger than the second pixel.

The gain determining unit determines a conversion gain for the signal component of the first pixel according to the achromatic signal value and the local signal.

The tone-conversion unit converts the tone by multiplying, by the conversion gain, the signal component of the first pixel or a signal according to the signal component.

<<2>> Preferably, the gain determining unit generates a composite signal of the achromatic signal value and the local signal, and determines the conversion gain according to a function of a predetermined gain curve with the composite signal as an input variable.

<<3>> Preferably, the gain determining unit generates a composite signal Z1 by an equation:

$$Z1 = \beta \cdot Z + \alpha \cdot VL$$

where $\alpha$ and $\beta$ are weighting factors, the achromatic signal value is Z, the local signal is VL, and the composite signal is Z1.

<<4>> Preferably, the tone-conversion device includes a display control unit and a changing unit.

The display control unit controls a display of the tone-converted image.

The changing unit changes the weighting factors.

<<5>> Preferably, the tone-conversion device includes a determining unit and a changing unit.

The determining unit determines whether or not the main subject of the image is a person.

The changing unit sets a ratio $\alpha/\beta$ of the weighting factors to be larger when the determining unit does not determine that the main subject of the image is a person than when the determining unit determines that the main subject of the image is a person.

<<6>> Preferably, the neighborhood processing unit calculates the local signal according to a signal V expressed by the following equation:

$$V = Z + w1 \cdot |C1| + w2 \cdot |C2|$$

where w1 and w2 are weighting factors, the achromatic signal of the neighborhood area is Z, and the chromatic signals are C1 and C2.

<<7>> Preferably, the neighborhood processing unit generates a reduced image composed of the signal V expressed by $$V = Z + w1 \cdot |C1| + w2 \cdot |C2|$$

where w1 and w2 are weighting factors, the achromatic signal of the neighborhood area is Z, and the chromatic signals are C1 and C2. The neighborhood processing unit generates the local signal according to the signal value of the reduced image.

<<8>> Preferably, the neighborhood processing unit defines as the first pixel a pixel at the intermittent position among pixels composing the image and finds the reduced image composed of the signal V relating to the first pixel. The neighborhood processing unit interpolates and magnifies the found reduced image to find the local signal.

<<9>> Preferably, the neighborhood processing unit performs a computation processing of one of a group of values to the signals of Z, C1, and C2 of the image with every predetermined interval to reduce the number of pixels of the signals Z, C1, and C2, the group of values being composed of local average, local median, and other statistical averages of the signals Z, C1 and C2 of the image. The neighboring processing unit finds the signal V from the pixel-reduced signals Z, C1, and C2 to find the reduced image composed of the signal V. The neighboring processing unit interpolates and magnifies the found reduced image to find the local signal.

<<10>> Preferably, the neighborhood processing unit finds a thinned image by thinning pixels from the image. The neighborhood processing unit performs a computation processing of one of a group of values to the signals of Z, C1, and C2 of the thinned image with every predetermined interval to reduce the number of pixels of the signals Z, C1, and C2, the group of values being composed of local average local median, and other statistical averages of the signals Z, C1, and C2. The neighborhood processing unit finds the signal V from the pixel-reduced signals Z, C1, and C2 to find the reduced image composed of the signal V. The neighborhood processing unit interpolates and magnifies the found reduced image to find the local signal.

<<11>> Preferably, a reduction ratio of the reduced image and the image is 1/8 or lower.

<<12>> Preferably, the neighborhood processing unit performs predetermined filtering on the reduced image. The neighborhood processing unit interpolates and magnifies the filtered reduced image to find the local signal.

<<13>> A tone-conversion program of the present invention causes a computer to function as the tone-conversion device according to the aforementioned <<1>>.

<<14>> An electronic camera of the present invention includes the tone-conversion device described in any one of the aforementioned <<1>> to <<12>> and an image-capturing unit which captures an image of a subject to generate an original image. The electronic camera includes a tone-conversion function to convert a tone of the original image generated by the image-capturing unit using the tone-conversion device.

<<15>> A tone-conversion method of the present invention converts a tone of an image generated from plural pixels having a signal component including an achromatic signal relating to brightness and a chromatic signal relating to color, and includes the following steps of:

(Step 1) extracting the achromatic signal of a first pixel or a second pixel from plural pixels as an achromatic signal value, the second pixel being in an immediate neighborhood of the first pixel;

(Step 2) generating a local signal of the first pixel according to the achromatic signal and the chromatic signal of a third pixel contained in a neighborhood area which is larger than the second pixel;

(Step 3) determining a conversion gain for the signal component of the first pixel according to the achromatic signal value and the local signal; and (Step 4) converting the tone by multiplying, by the conversion gain, a signal component of the first pixel or a signal according to the signal component.

<<16>> Preferably, the step of determining the conversion gain generates a composite signal of the achromatic signal value and the local signal. In this case, the conversion gain is determined according to a function of a predetermined gain curve with the composite signal as an input variable.

BRIEF DESCRIPTION OF THE DRAWINGS

Other and further objects, features and advantages of the present invention described above will appear more fully from the following description.

DESCRIPTION OF THE PREFERRED EMBODIMENTS

First Embodiment

<<Description of Configuration>>

Figure 1:
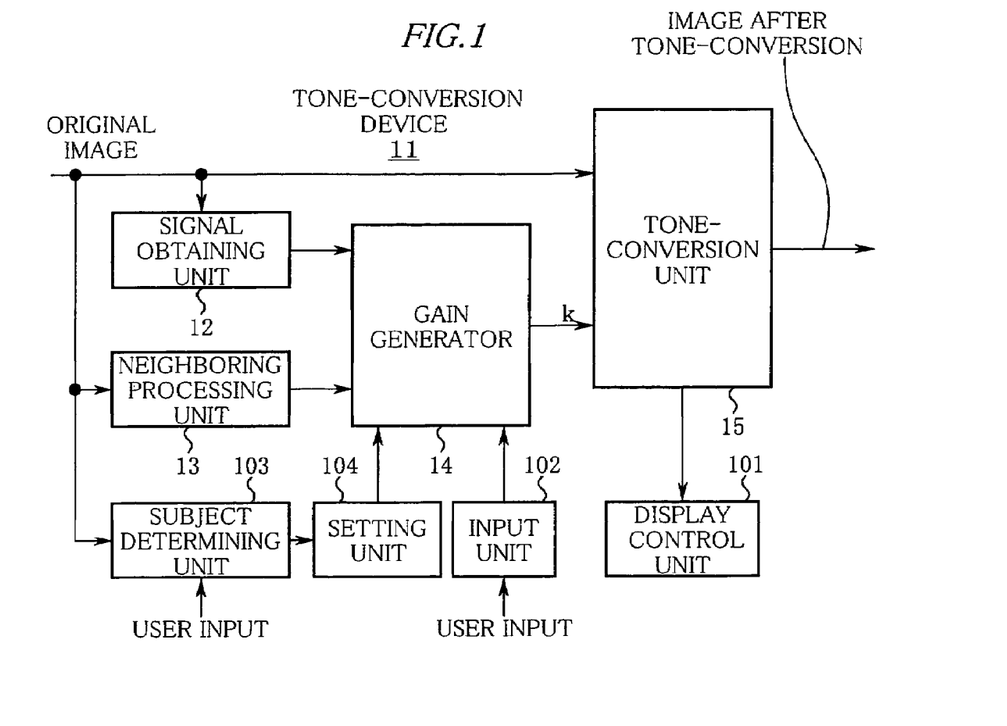
FIG. 1 is a block diagram showing a configuration of a tone-conversion device.

FIG. 1 is a diagram showing a configuration of a tone-conversion device 11.

In FIG. 1, the tone conversion device 11 includes the following constituent features:

(1) a signal obtaining unit 12 to obtain an achromatic signal Z indicating brightness of an original image which is taken in by the tone-conversion device 11 via an electronic camera, a communication medium, a recording medium, or the like.

(2) a neighborhood processing unit 13 to extract a neighborhood area from each pixel of the original image and processes pixels in the neighborhood area to obtain a local signal VL.

(3) a gain generator 14 to find a conversion gain k for each pixel according to the signal Z and the local signal VL.

(4) a tone conversion unit 15 to convert the tone by multiplying a signal of each pixel of the original image by the conversion gain k for each pixel. Here, "multiplying" denotes that the signal of the original image is increased and decreased depending upon the conversion gain k, and it is not limited to an arithmetic multiplication processing.

(5) a display control unit 101 to generate display images for sequential outputs to an image display unit so as to monitor the result of the tone conversion.

(6) an input unit 102 to accept a user's operation input with GUI (Graphical User Interface) or the like and change weighting factors α, β described later depending upon the operation input.

(7) a subject determining unit 103 to determine whether or not the main subject of the original image is a person. This determination is made based on at least any one of the following factors; a user input, accompanying information (such as a photographing mode when photographing) of the original image, and a result of the subject determination by a face recognition or a scene translation.

(8) a setting section 104 to set a ratio of the weighting factors α, β to be larger when the main subject of the original image is not a person than when the main subject is a person.

The above-described tone-conversion device 11 may be partly or entirely composed of hardware. Alternatively, the tone-conversion device 11 may be realized on a computer as software by the use of a tone conversion program.

Figure 2:
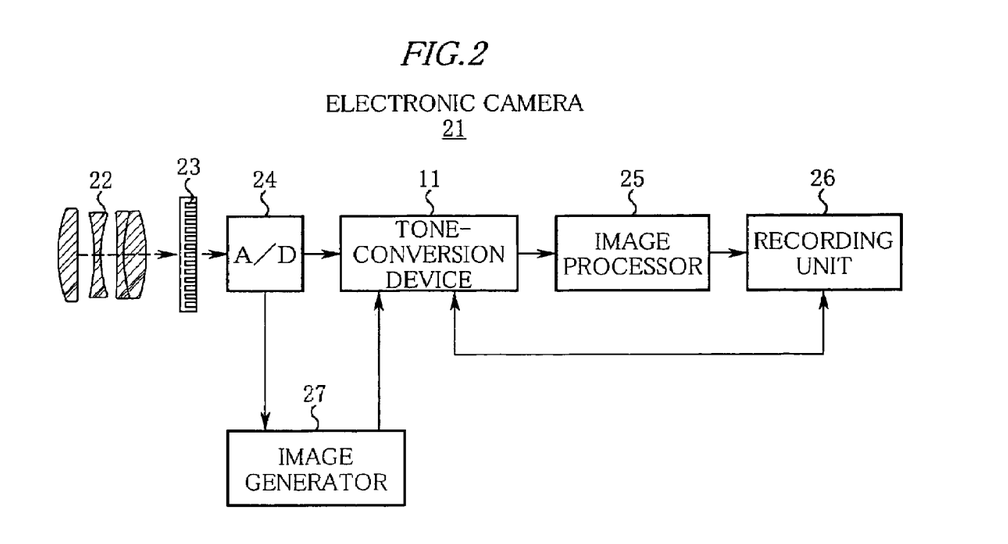
FIG. 2 is a block diagram showing a configuration of an electronic camera.

FIG. 2 is a diagram showing an electronic camera 21 including the tone-conversion device 11 as described above.

In FIG. 2, an image-capturing lens 22 is attached to the electronic camera 21. An image-capturing surface of an image sensor 23 is disposed on an image space side of the image-capturing lens 22 via an aperture and a shutter which are not shown. An image signal outputted from the image sensor 23 is inputted to the tone-conversion device 11 as the original image via an A/D converter 24 and so on. The tone-conversion device 11 applies the tone conversion to the original image. The image signal outputted from the tone-conversion device 11 is subjected to image processing through an image processor 25 and then recorded in a recording unit 26.

The tone-conversion device 11 can also read recorded image data from the recording unit 26 for tone conversion at a later time.

An image generator 27 may be provided between the A/D converter 24 and the tone conversion-device 11. The image generator 27 converts an output of the A/D converter 24 into an original image of a luminance/color difference signal (YCbCr or the like) to give it to the tone-conversion device 11. In a case where the image sensor 23 is a single-plate image sensor with a Bayer pattern or the like, the image generator 27 interpolates the output of the A/D converter 24 to output the luminance/color difference signal (YCbCr or the like).

<<Description of Operations>>

Figure 3:
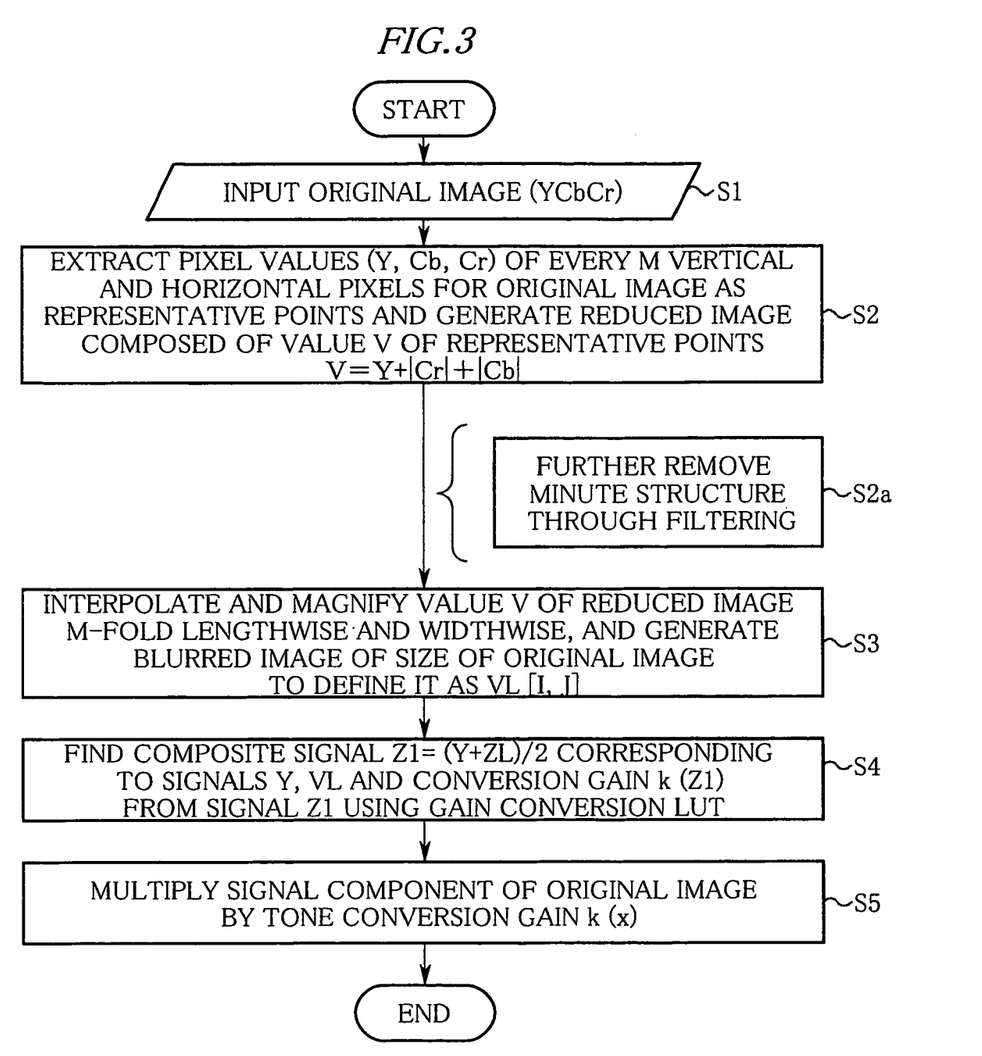
FIG. 3 is a flowchart explaining operations in an embodiment.

FIG. 3 is a flowchart to describe operations of the first embodiment. Hereinafter, the operations in the first embodiment will be described in the sequence of the step number shown in FIG. 3.

[Step S1] The tone-conversion device 11 takes in an original image. This original image is composed of color components of (Y, Cr, Cb). In this case, a luminance signal Y corresponds to the achromatic signal. The color difference signals Cr, Cb correspond to the chromatic signals.

[Step S2] The signal obtaining unit 12 defines a signal value Y of a pixel in the coordinate position [i, j] of the original image as the signal value Y [i, j]. Note that, the signal value Y [i, j] may be defined based on the signal value Y of the pixel of an immediate neighborhood of the coordinate position [i, j].

On the other hand, the neighborhood processing unit 13 defines as the neighborhood area an area larger than the immediate neighborhood in the coordinate position [i, j] of the original image, and generates the local signal VL [i, j] reflecting YCbCr contained in the pixel in the neighborhood area through filtering processes such as an average, a median, and an epsilon filtering, for example.

Figure 4:
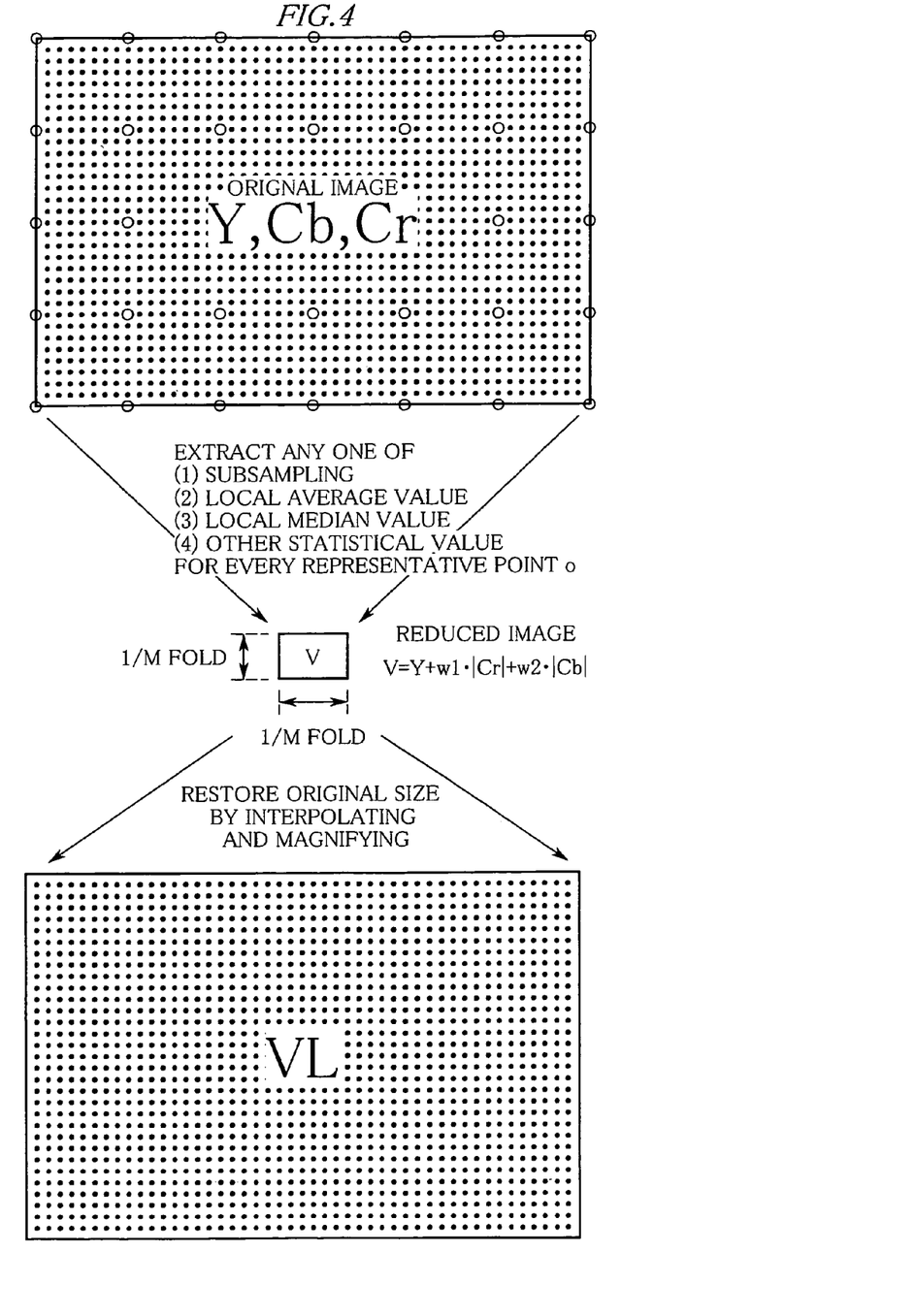
FIG. 4 is a chart showing an example of calculation of a local signal VL.

FIG. 4 is a chart showing an example of calculation of the local signal VL.

Firstly, the neighborhood processing unit 13 defines the representative points (pixels) of every M vertical and horizontal pixels of the original image according to predetermined sampling interval M and finds three components of the representative points, Y [i, j], Cr [i, j], and Cb [i, j]. Here, M≧2 is preferable and M≧8 is more preferable. M for the vertical pixels and M for the horizontal pixels may be different.

As a method of finding three components Y [i, j], Cr [i, j], and Cb [i, j] of a representative point, any of the following processing is preferable.

(1) Subsampling of every M vertical and horizontal pixels (thinning processing)

(2) Calculating a weighted average value and a simple average value of the respective signal values YCbCr of the pixels in the local area including the representative point (local average processing)

(3) Calculating a median value of the respective signal values YCbCr of the pixels in the local area including the representative point (local median processing)

(4) Calculating a statistical average value of the respective signal values YCbCr of the pixels in the local area including the representative point (statistical average processing)

Based on three components Y [i, j], Cr[i, j], Cb [i, j] of the representative points found in this way, the signal V [i, j] is calculated by the following equation:

$$V[i,j]=Y[i,j]+|Cr[i,j]|+|Cb[i,j]|$$

where | | refers to an absolute value operation.

This may be replaced by the following equation where weights w1, w2 of |Cr [i, j]| and |Cb [i, j]| are appropriately set from an image quality evaluation, a simulation, and etc.

$$V[i,j]=Y[i,j]+w1\cdot|Cr[i,j]|+w2\cdot|Cb[i,j]|$$

Through such processing, the reduced image composed of the signal V of the representative points may be found.

This may be replaced by the following equation where RGB values of the thinned representative points as a result of thinning pixels of the original image are used.

$$V[i,j]=\max(R[i,j],G[i,j],B[i,j])$$

Also through such processing, the reduced image composed of the signal V of the representative points may be found.

If the original image is a RAW image such as a Bayer pattern, the signal V may be found from the collected signal component after collecting the signal component from the neighborhood area of the representative points. Also through such processing, the reduced image consisting of the signal V of the representative points may be obtained.

[Step S3] As shown in FIG. 4, the neighborhood processing unit 13 interpolates and magnifies the reduced image, which consists of a set of the representative points of every M pixels, M-fold lengthwise and widthwise, thereby creating an image of a size of the original image. If M is an exponetiation value of 2, interpolating and magnifying 2-fold each lengthwise and widthwise through several phases may be performed.

For example, for interpolating and magnifying performed here, publicly known interpolation technology such as bicubic or bi-linear method may be used. Especially, the bicubic method is preferable for obtaining a smooth interpolation image. In addition, in the process of interpolating and magnifying the reduced image, the interpolation image may be subjected to smoothing appropriately by executing low-pass filtering.

The image of a size of the original image is one-component image of the signal V in which a minute structure is removed from the original image. A value of the pixel position [i, j] of this one-component image is defined as VL[i, j].

The local signal VL becomes a large value reflecting the value of the large luminance signal Y (the achromatic signal Z) in a bright neighborhood area. Further, in a neighborhood area with high saturation, it becomes a large value reflecting an absolute value of a large color difference signal CrCb (the chromatic signals C1, C2). Conversely, it becomes a small value in a dark and low-saturation neighborhood area. From this trend, it is understood that the neighborhood area with an extremely large local signal VL is a portion with high luminance and high saturation in which a saturation phenomenon such as wash out or color saturation may easily occur. On the other hand, it is understood that the neighborhood area with an extremely small local signal VL is a portion with low luminance and low saturation and has a not comparatively conspicuous image structure and poor contrast.

[Step S4]

The gain generator 14 determines the conversion gain k of the pixel [i, j] based on the signal Y[i, j] and the local signal VL [i, j].

For example, the gain generator 14 finds the composite signal Z1 [i, j] from the signal Y [i, j] and the local signal VL [i, j] by an equation:

$$Z1[i,j]=(Y[i,j]+VL[i,j])/2$$

This may be replaced by the following equation where a ratio of weights α, β is appropriately set from an image quality evaluation, a simulation, and etc.

$$Z1[i,j]=\beta \cdot Y[i,j]+\alpha \cdot VL[i,j])$$

Here, β may be calculated by β=1−α (where 0<α<1)

The gain generator 14 sequentially substitutes the composite signal Z1[i, j] in a function k (Z1) of the gain curve to find a gain map k[i, j] for one screen.

Upon taking the local signal VL [i, j] into account in this way, the wash out and the color saturation can be prevented by suppressing the conversion gain k in a portion with the large local signal VL [i, j]. Further, in the portion with low luminance and low saturation with the extremely small local signal VL [i, j], increasing the conversion gain k makes it possible to emphasize a less conspicuous tone change in the detailed portion.

Figure 5:
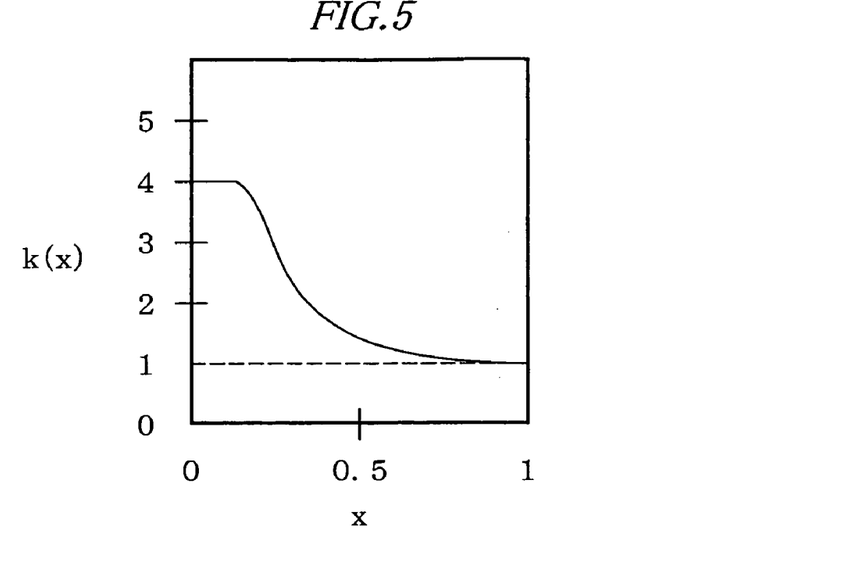
FIG. 5 is a chart showing an example of a function of a gain curve.

FIG. 5 is a chart showing an example of the function k (Z1) of the gain curve. In addition, an input variable Z1 is exhibited as x therein.

This function k (Z1) is a function that reaches the maximum gain, that is, 2 to 10, in a region where Z1 is small and decreases as Z1 increases. The gain generator 14 preferably stores the function k (Z1) of the gain curve as a LUT (lookup table). In this case, the gain generator 14 may quickly find the conversion gain k from the composite signal Z1 by referring to data of the LUT.

[Step S5] The tone conversion unit 15 applies the tone conversion expressed as the following equations for each pixel [i, j] of the original image:

$$Y'[i,j]=k[i,j] \times Y[i,j]$$

$$Cr'[i,j]=k[i,j] \times Cr[i,j]$$

$$Cb'[i,j]=k[i,j] \times Cb[i,j]$$

Through such processing, the tone-converted image Y'Cb'Cr' is obtained.

<<Effects etc. of First Embodiment>>

In the present embodiment, the conversion gain k for the tone conversion is determined based on the value of the pixel (or the immediate neighborhood) and the value of the neighborhood area of the pixel. As a result, it is made possible to realize in a balanced manner both the brightness/darkness balance of the whole image and the rise of the tone of the detailed portion like differentiating the value of the conversion gain k in case where the pixel of the conversion subject is positioned in a dark neighborhood area from that in case where positioned in a bright neighborhood area.

Specifically, in the present embodiment, the signal component Y originally contained in the original image is used as it is as the value of the pixel (or the immediate neighborhood). Generally, the number of pixels of the original image is so enormous that converting the pixel value one by one for generation will increase the processing load. In the present embodiment, the signal component Y (the achromatic signal Z) originally contained in the original image is used as it is, which largely reduces the processing load that will arise to find the signal.

Further, the present embodiment finds the value V of the representative points of every M pixels to generate the reduced image, and interpolates and magnifies the reduced image M-fold to obtain the local signal VL reflecting YCbCr components of the neighborhood area respectively.

In this case, the number of pixels of the reduced image is reduced to $1/(M^2)$ against that of the original image. The number of operations of the signals V and VL is largely reduced in accordance with the decrease in the number of pixels of the reduced image. As a result, finding the local signal VL with less processing load than executing the filtering to all pixels of the original image to find the local signal VL is made possible.

These synergistic effects make it possible that the conversion gain map suitable for the detailed tone adjustment may be created with extremely small processing load.

Second Embodiment

The second embodiment relates to an improvement of Step S2 of the first embodiment.

In the second embodiments, the value Z [i, j] of the representative points of every M pixels is found from the pixel value of the neighborhood area. For example, an average value in a neighborhood within a range of r from the representative point [i. j] is calculated by the following equation to find the signal V [i, j] of the reduced image:

$$V[i,j] = \left[ \sum_{-r \leq s, t \leq r} (Y[i+s,i+t] + |Cr[i+s,i+t]| + |Cb[i+s,i+t]|) \right] / S$$

where $S=(2 \times r+1) \times (2 \times r+1)$

The signal value V [i, j] of the reduced image is not limited to this but may be a median value or statistical average value in the neighborhood area. Further, the signal value V [i, j] may be an average value of values in the neighborhood area excluding values greatly deviated by a predetermined value or more.

Generally, when a sampling pitch M is small, the necessity for averaging processing in the neighborhood of the representative point is low. However, when the sampling pitch M is equal to or larger than a certain degree, such averaging processing can produce a better result.

The other processing is the same as that of the first embodiment, and therefore description thereof will not be repeated here.

Third Embodiment

A third embodiment relates to an improvement of Step S2 in the first and second embodiments.

Here, in the process of finding the reduced image, filtering is inserted as Step S2a. An effective example of filtering is a local product sum operation using the following local operator.

$$\begin{bmatrix} 1 & 2 & 1 \\ 2 & 4 & 2 \\ 1 & 2 & 1 \end{bmatrix}$$

Of course, the coefficients and matrix size of the filtering are not limited to the above.

Such filtering is effective processing when only the variable magnification of the reduced image does not suffice for smoothing the local signal VL.

The filtering other than the smoothing is also an effective processing to the reduced image.

For example, the tone conversion may be applied to the reduced image. Through this processing, the tone characteristics of the local signal VL generated from the reduced image may be changed, which makes it possible to adjust appropriately the value of the conversion gain k reflecting the local signal VL.

For example, the reduced image may also be subjected to noise (detail) removal such as E-filtering. Through this processing, the noise or the detail that will be mixed into the conversion gain k via the local signal VL may be suppressed.

Further, for example, the filtering such as contour enhancement or contour extraction processing which will change the image structure may be executed to the reduced image. Through this processing, the change of the image structure may be reflected to the conversion gain k.

The other processing is the same as those of the first to second embodiments, and therefore description thereof will not be repeated here.

Fourth Embodiment

Figure 6:
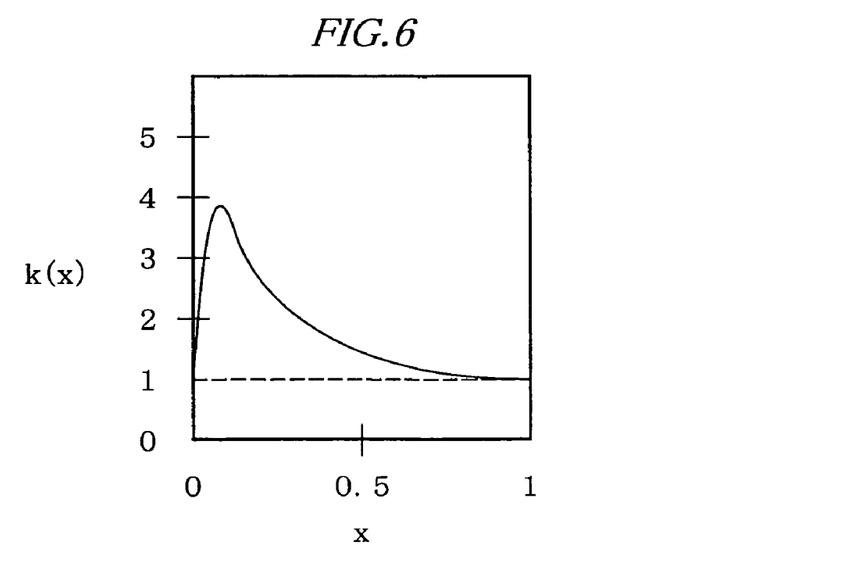
FIG. 6 is a chart showing an example of the function of the gain curve.

In the first embodiment, when the composite signal Z1 is small, the gain k is made large, as shown, for example, in FIG. 5. However, it is supposed that such the function k(Z1) of the gain curve may cause an adverse effect such as an emphasized noise in a dark portion depending on an image. When the noise in the dark portion is thus large, or when the level in a portion whose pixel value is close to zero is preferably reduced, it is preferable that the gain k is set close to 1 in a region where the composite signal Z1 is close to zero, as shown in FIG. 6.

Figure 7:
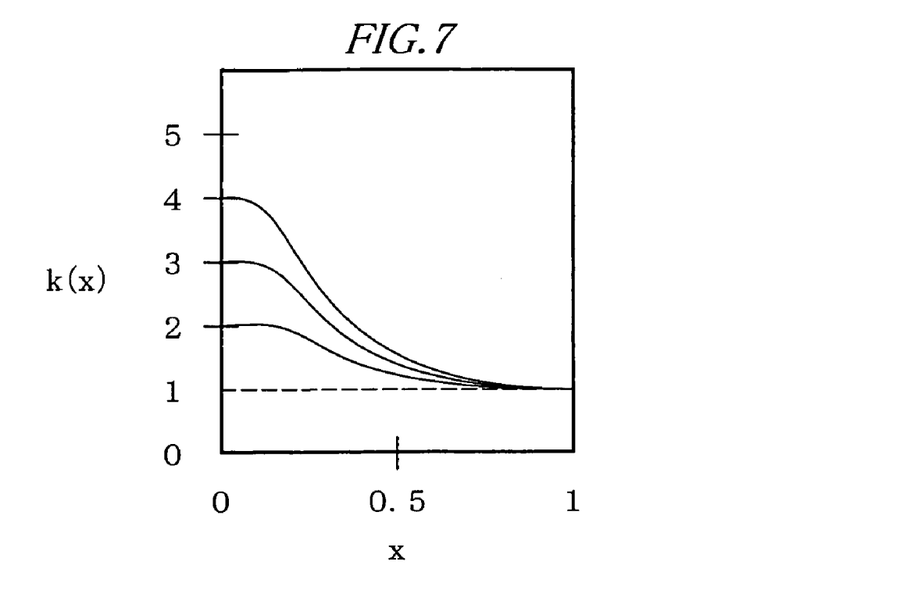
FIG. 7 is a chart showing an example of the function of the gain curve.

Further, in FIG. 5, the maximum gain in the dark portion is set to four, but the maximum gain in the dark portion can be arbitrarily set as shown in FIG. 7. In this case, the maximum gain is preferably set to roughly 15 or less. In an electronic camera or a computer, the maximum gain shown in FIG. 7 may be switched according to the result of selection from high, moderate, low which are provided as options for tone compression.

Figure 8:
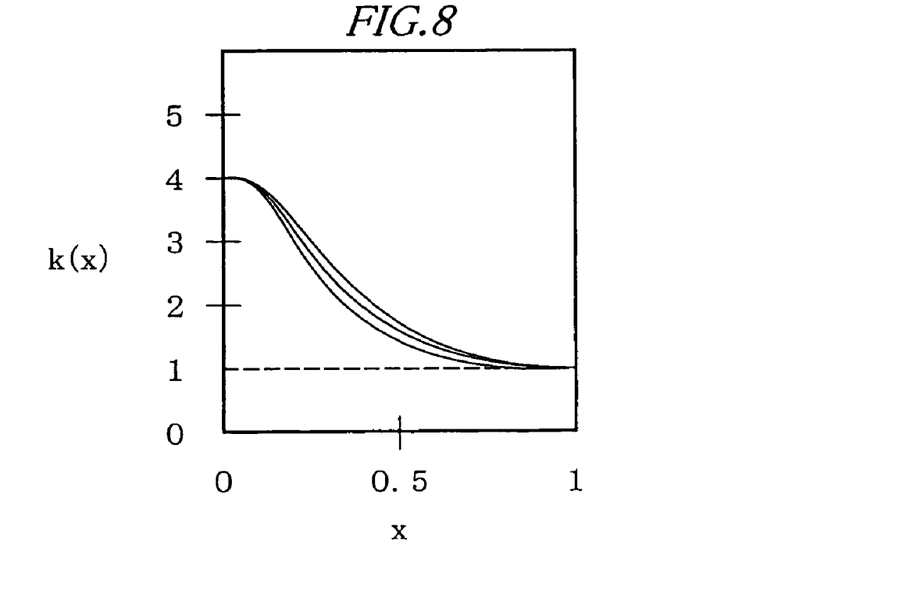
FIG. 8 is a chart showing an example of the function of the gain curve.

Note that brightness change in a moderate-brightness portion and a high-brightness portion in the tone conversion can be achieved by changing the gain curve in an intermediate region of the composite signal Z1 as shown in FIG. 8.

The other processing is the same as those of the first to third embodiments, and therefore description thereof will not be repeated here.

Fifth Embodiment

Figure 9:
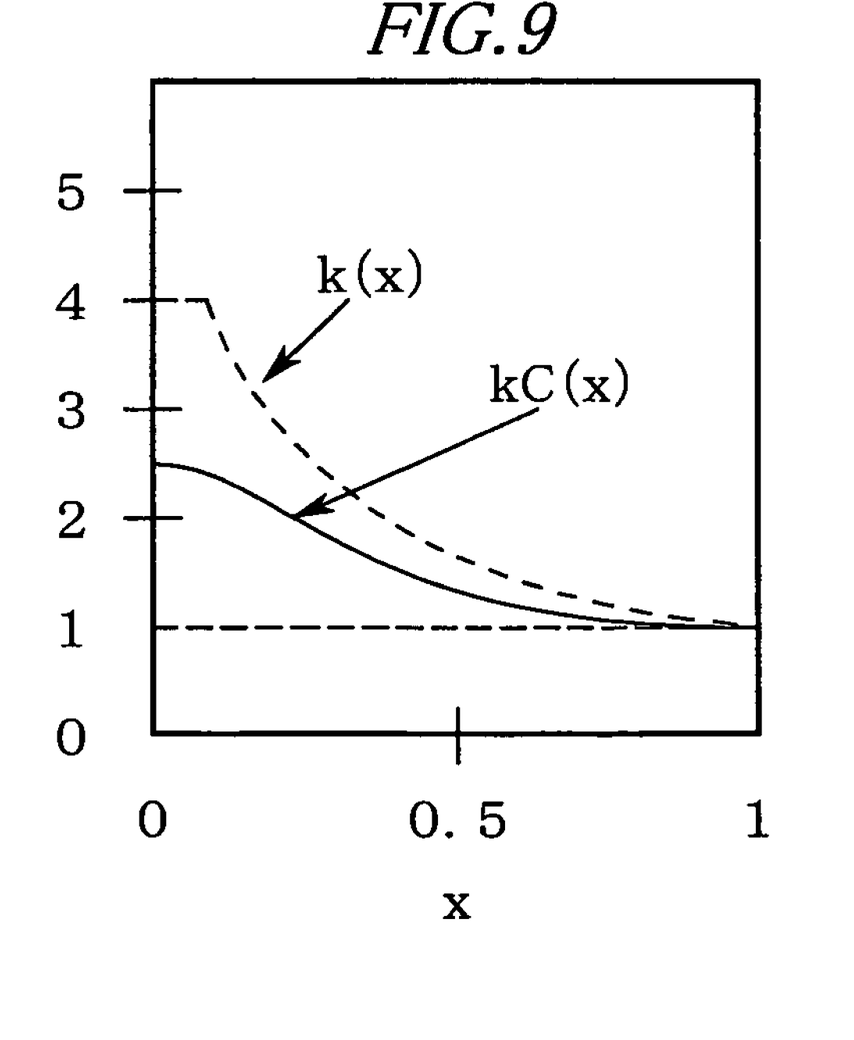
FIG. 9 is a chart showing an example of the function of the gain curve.

In a kind of dynamic range compression described above, saturation in the dark portion sometimes gets excessively high. In such a case, the conversion gain k[i, j] of the color difference components is changed to, for example, kC[i, j] shown in FIG. 9 as in the following equations.

$$Y'[i,j]=k[i,j] \times Y[i,j]$$

$$Cr'[i,j]=kC[i,j] \times Cr[i,j]$$

$$Cb'[i,j]=kC[i,j] \times Cb[i,j]$$

The relation of k(Z1) and kC(Z1) is preferably determined through experiment based on subjective evaluation of image quality, etc. Further, it is also preferable to record kC(Z1) as the LUT.

The other processing is the same as those of the first to fourth embodiments, and therefore description thereof will not be repeated here.

Sixth Embodiment

The sixth embodiment relates to an improvement of Step S2 of the first to fifth embodiments.

Figure 10:
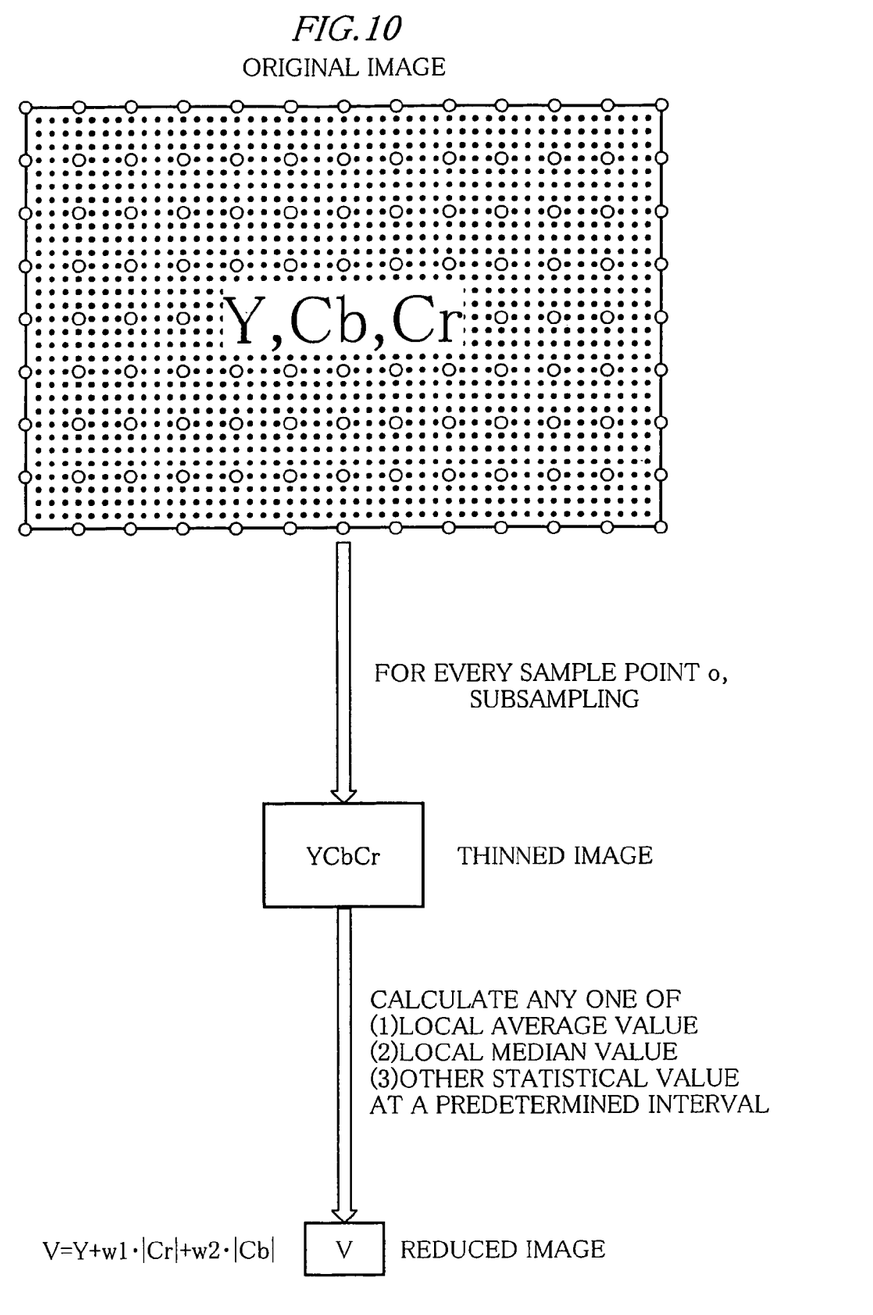
FIG. 10 is a chart showing an example of calculation of the local signal VL.

FIG. 10 is a chart showing an example of calculation of a local signal VL.

As shown in FIG. 10, the neighborhood processing unit 13 performs thinning of the signals YCbCr of the original image according to the predetermined sampling intervals to find the thinned image whose number of pixels is reduced. The number of pixels of the thinned image is set to the intermittent number of pixels between those of the original image and the reduced image.

The representative points are defined for every predetermined interval of the thinned image to find three components Y [i, j], Cr [i, j] and Cb [i, j] of the representative point.

As the method of finding three components Y [i, j], Cr [i, j], and Cb [i, j] of the representative point, any of the following processing is preferable.
(1) Calculating a weighted average value and a simple average value of YCbCr respectively in the local area including the representative points (local average processing)
(2) Calculating a median value of YCbCr respectively in the local area including the representative points (local median processing)
(2) Calculating a statistical average value of YCbCr respectively in the local area including the representative points (statistical average processing)

Based on three components Y[i, j], Cr[i, j] and Cb[i, j] of the representative points found in this way, the signal V [i, j] is calculated by the following equation:

$$V[i,j]=Y[i,j]+|Cr[i,j]|+|Cb[i,j]|$$

where | | refers to an absolute value operation.

This may be replaced by the following equation where weights w1, w2 of |Cr[i, j]| and |Cb[i, j]| are appropriately set from an image quality evaluation, a simulation, and etc.

$$V[i,j]=Y[i,j]+w1 \cdot |Cr[i,j]|+w2 \cdot |Cb[i,j]|$$

Through this processing, the reduced image composed of the signal V of the representative point may be found.

The other processing is the same as those of the first to fifth embodiments, and therefore description thereof will not be repeated here.

Seventh Embodiment

In the above-described embodiment, when finding the composite signal Z1, the weighting factors of the local signal VL and the signal Y, namely, $\alpha$ and $\beta$ are fixed to default values (e.g. $\alpha=\beta=0.5$).

However, the ratio of the weighting factors, α/β is positively set variable, which enables to make the image quality after the tone conversion variable. For example, the ratio of the weighting factors, α/β is made large, which increases a ratio of the local signal VL occupied in the composite signal Z1, resulting in a contrast after the tone conversion becoming high. Conversely, the ratio of the weighting factors, α/β is made small, which decreases a ratio of the local signal VL occupied in the composite signal Z1, resulting in the contrast after the tone conversion becoming low.

In the seventh embodiment, utilizing this phenomena adds the freedom of the image quality adjustment in the processing of the tone conversion according to the present inventions.

Figure 11:
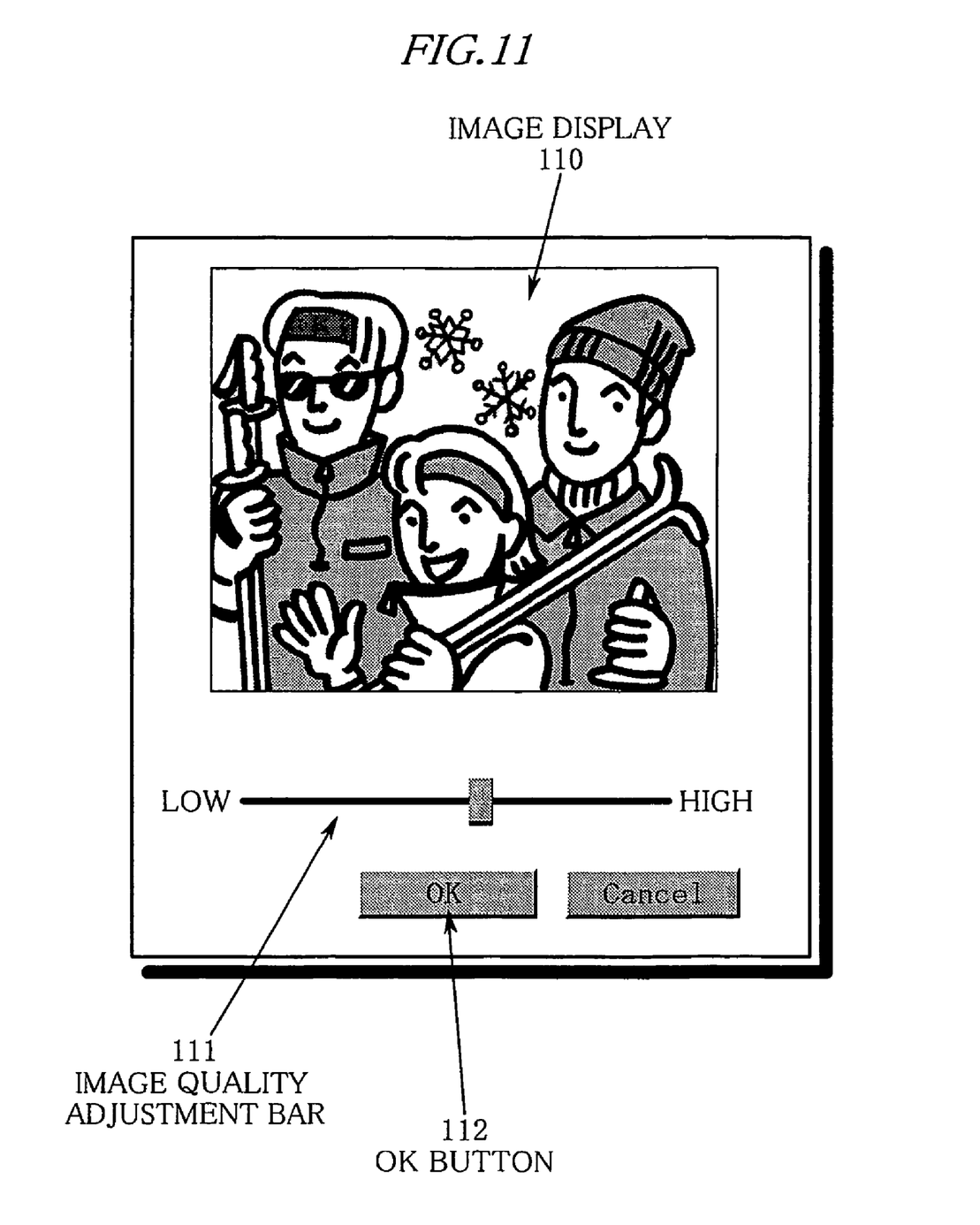
FIG. 11 is a chart showing GUI operations of weighting factors α and β.

Firstly, a display control unit 101 shown in FIG. 1 displays an image on an image display unit (such as a monitor screen) to monitor the image quality after the tone conversion. FIG. 11 is a chart illustrating an example of displaying the image. A user performs a GUI operation of an image quality adjustment bar 111 using an input device such as a mouse, viewing an image display 110. An input unit 102 shown in FIG. 1 changes the weighting factors α, β according to the GUI operation of the image quality adjustment bar 111. The change of the weighting factors, α, β is sequentially reflected to the image quality of the displayed image on the image display 110 through the gain generator 14 and the tone conversion unit 15.

Consequently, the user may manually adjust the weighting factors α, β such that the image display 110 has the desired image quality.

The other processing is the same as those of the first to sixth embodiments, and therefore description thereof will not be repeated here.

Eighth Embodiment

In the eighth embodiment, the weighting factors α, β are automatically defined depending upon the type of the main subject of the original image.

That is, a subject determining unit 103 judges whether or not a person is the main subject of the original image based on the following information:
(1) A user' selection input of the subject;
(2) Photographing information of an electronic camera associated with the original image (information such as a person photographing mode/a scene photographing mode); and
(3) A result of the subject determination for the original image (publicly known face recognition, etc.)

The setting unit 104 sets the ratio α/β of the weighting factors larger in case where a person is not the main subject than that in case where a person is the main subject. The degree of changing a setting is preferably set in advance based on subjective evaluation of image quality and the like.

Through the above-mentioned processing, in the original image, the subject of which is a scenery, the contrast after the tone conversion may automatically be raised, enabling to make a scene image more favorable. Conversely, in the original image, the subject of which is a person, the contrast after the tone conversion may automatically become softer, enabling to describe the person more naturally.

The other processing is the same as those of the first to seventh embodiments, and therefore description thereof will not be repeated here.

[Supplemental Items of Embodiments]

The above embodiments have described the cases where the tone conversion is executed by using a tone-conversion device, a computer, or an electronic camera. However, the present invention is not limited thereto. For example, the above-described tone conversion methods may be provided in an image processing server (image album server and the like) on the Internet as a service to users, and be applied to the image data sent from the user.

Further, the above embodiments have described the cases where the tone conversion is applied to the whole image. However, the present invention is not limited thereto. For example, the tone conversion may be applied only to part of a screen (a main subject, a shadow portion, a trimming range, a face recognition area, a background portion excluding a figure and a flesh color area, or the like).

In the above embodiments, the signal Z is found from the pixel value of the pixel position [i, j]. However, the embodiments are not limited thereto. For example, the signal Z may be found from a pixel value in an immediate neighborhood of the pixel position [i, j]. For example, since in RAW data, all the colors are not obtained for each pixel, the signal Z may be generated by adding other colors in the immediate neighborhood.

Further, in the above embodiments, the predetermined k( ) is used as the function of the gain curve. However, the embodiments are not limited to this. For example, the predetermined k( ) may be adaptively or selectively changed according to an image or an image-capturing condition.

In addition, in the above-mentioned embodiment, by obtaining the signal V on the representative points of the original image, the reduced image may be generated with small processing load. However, the present embodiments are not limited thereto. For example, by converting the signal of original image to obtain the signal V and reducing the number of pixels of the image relating to the signal V, the reduced image composed of the signal V may be generated.

Further, in the above-described embodiments, the use of a quick view image as the reduced image of the present embodiment is also preferable. Generally, the quick view image is created in addition to a high-resolution image in an electronic camera and a computer as simple display of an image. Sometimes, the quick view image is stored in advance in an image file of the original image. Generating one component image from such quick view image and interpolating and magnifying the one component image enables higher-speed calculation of the local signal VL.

In addition, in the above-described embodiment, the local signal VL is calculated by variably magnifying the reduced image to a size of the original image. However, the size after magnification is not necessarily made to be same as that of the original image. For example, if the reduced image is magnified to the size of 1/P-fold lengthwise and 1/Q-fold widthwise of the original image, the signal V for one pixel after the magnification may be adopted as the local signal VL for P×Q pixels (lengthwise×widthwise).

In addition, in the above-described embodiment, filtering is executed on the reduced image before being variably magnified, however, the embodiment is not limited thereto. For example, filtering may be executed during the process of variably magnifying or thereafter.

Further, in the above-described embodiment, if VL[i, j] is used as it is, shadows tend to be excessively exaggerated depending on an image. This can produce a favorable impression and effect in an image such as a scenery image. However, a figure image, if its shadows are unnaturally exaggerated, gives an unnatural impression.

In this case, including the structure of Y[i, j] in VL[i, j] as in the following equation provides an effect of inhibiting the exaggeration of shadows:

$$VL[i,j] = Y[i,j] \times (1-\gamma) + VL[i,j] \times \gamma$$

where 0<γ<1, and the optimum γ is preferably determined from an image quality evaluation, a simulation, or etc.

It has been confirmed that thus including the structure of Y[i, j] in VL[i, j] provides an effect not only of inhibiting the exaggeration of shadows but also of inhibiting the occurrence of a halo in a portion with a great luminance difference.

[Difference Between the Embodiments and Patent Document 1]

Differences between the above-described embodiments and Patent document 1 will be described for reference.

(1) In Patent document 1, a gain F is controlled by an epsilon filter value (a small amplitude component in a high band). On the other hand, in the above-described embodiments, the gain k is controlled both by the signal value of the pixel and by the signal value of the neighborhood area. In this respect, the embodiments are different from Patent document 1.

(2) Patent document 1 does not describe any method for a color image. On the other hand, in the above-described embodiments, the plural color components of a color image are composed, whereby one signal plane (for example, the signals V, VL or the like), which controls the gain k, is generated. In this respect, the embodiments are different from Patent document 1.

(3) Further, in the above-described embodiments, the gain k changes, reflecting a signal Z of two pixels, the signal VL of the neighborhood area. This is also what makes the embodiments different from Patent document 1.

(4) Moreover, in the above-described embodiments, variations such as Z=Y and VL=VL are possible. This is also what makes the embodiments different from Patent document 1.

(5) Further, in the above-described embodiments, it is also possible to generate the local signal VL from the reduced image. This is also what makes the embodiments different from Patent document 1.

[Application to Other Color Coordinate Systems]

In YCbCr color specification systems of the above-described embodiment, an achromatic signal Y and a chromatic signals Cb, Cr are defined. However, in actual color specification systems, various names are assigned to the signal components of the achromatic color and the chromatic color corresponding thereto. The present signal is thus feasible with these signal components.

Figure 12:
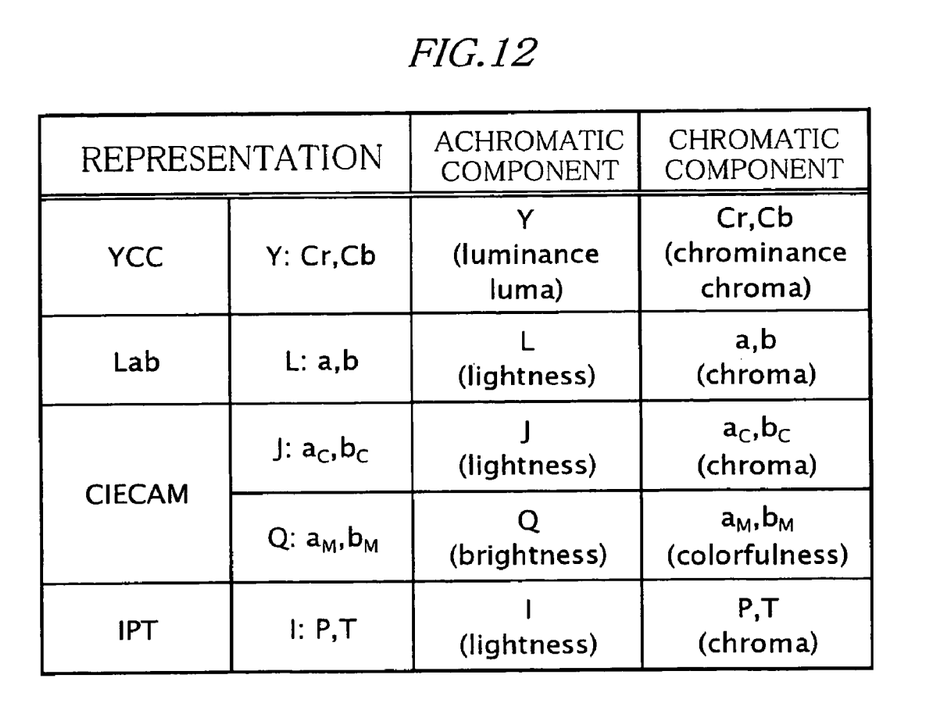
FIG. 12 is a chart showing variations of an image signal.

Here, the relation between the typical color specification system and the achromatic color/chromatic color is shown in FIG. 12. Consequently, an achromatic signal Y and a chromatic signals Cb, Cr of the present embodiments can be replaced in accordance with an example of table in FIG. 12. For example, in a CIECAM02 coordinate system, lightness J is usable in place of Y, and chroma ac, bc are usable in place of Cr, Cb. In another expression of the same coordinate system, brightness Q is usable in place of Y, and colorfulness aM, bM are useable in place of Cr, Cb. Also, in IPT color coordinate system, I is usable in place of Y, and P, T are usable in replace of Cr, Cb.

Here, plural chromatic signals C1, C2 can be once replaceable with C defined in the following equation:

$$C = \sqrt{C1^2 + C2^2}$$

In this case the above-mentioned V is approximated by the following equation:

$$V = Z + w3 \cdot |C1| + w4 \cdot |C2| \approx Z + w \cdot C$$

Further, not limited to the aforesaid achromatic/chromatic signal, among signal components constituting an image signal, a signal which is relatively near to the achromatic color (namely, assumed to be achromatic color) may be defined as the achromatic signal Z, and a signal which is relatively far from the achromatic color (namely, assumed to be chromatic color) may be defined as the chromatic signals C1, C2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A tone-conversion device converting a tone of an image generated from plural pixels having a signal component including an achromatic signal relating to brightness and a chromatic signal relating to color, said tone-conversion device comprising:

a signal extracting unit which extracts said achromatic signal of a first pixel or a second pixel from said plural pixels as an achromatic signal value, the second pixel being in an immediate neighborhood of the first pixel;

a neighborhood processing unit which generates a local signal of said first pixel according to said achromatic signal and said chromatic signal of a third pixel contained in a neighborhood area which is larger than said second pixel;

a gain determining unit which determines a conversion gain for said signal component of said first pixel according to said achromatic signal value and said local signal; and a tone-conversion unit which converts said tone by multiplying, by said conversion gain, a signal component of said first pixel or a signal according to the signal component.

2. The tone-conversion device according to claim 1, wherein said gain determining unit generates a composite signal of said achromatic signal value and said local signal, and determines said conversion gain according to a function of a predetermined gain curve with the composite signal as an input variable.

3. The tone-conversion device according to claim 2, wherein said gain determining unit generates said composite signal by an equation:

$$Z1 = \beta \cdot Z + \alpha \cdot VL$$

where α and β are weighting factors, said achromatic signal value is Z, said local signal is VL, and said composite signal is Z1.

4. The tone-conversion device according to claim 3 comprising:

a display control unit which controls display of the tone-converted image; and a changing unit which changes said weighting factors.

5. The tone-conversion device according to claim 3 comprising:
- a determining unit which determines whether or not a main subject of said image is a person; and
- a changing unit which sets a ratio $\alpha/\beta$ of said weighting factors to be larger when said determining unit does not determine that a main subject of said image is a person than when said determining unit determines that the main subject of said image is a person.

6. The tone-conversion device according to claim 1, wherein
said neighborhood processing unit calculates said local signal according to a signal V expressed by the following equation:

$$V = Z + w1 \cdot |C1| + w2 \cdot |C2|$$

where w1 and w2 are weighting factors, said achromatic signal of said neighborhood area is Z, and said chromatic signals are C1 and C2.

7. The tone-conversion device according to claim 1, wherein said neighborhood processing unit generates a reduced image to generate said local signal according to a signal value of the reduced image composed of the signal V, the signal V being expressed by an equation:

$$V = Z + w1 \cdot |C1| + w2 \cdot |C2|$$

where w1 and w2 are weighting factors, said achromatic signal of said neighborhood area is Z, and said chromatic signals are C1 and C2.

8. The tone-conversion device according to claim 7, wherein
said neighborhood processing unit defines as a first pixel a pixel at an intermittent position among pixels composing said image, finds said reduced image composed of said signal V relating to the first pixel, and interpolates and magnifies the found reduced image to find said local signal.

9. The tone-conversion device according to claim 7, wherein
said neighborhood processing unit performs a computational processing of one of a group of values to said signals of Z, C1, and C2 of said image with every predetermined interval to reduce a number of pixels of said signals Z, C1, and C2, finds said signal V from the pixel-reduced signals Z, C1, and C2 to find said reduced image composed of said signal V, and interpolates and magnifies the found reduced image to find said local signal, the group of values being composed of local average, local median, and other statistical averages of said signals Z, C1 and C2 of said image.

10. The tone-conversion device according to claim 7, wherein
said neighborhood processing unit finds a thinned image by thinning pixels from said image, performs a computation processing of one of a group of values to said signals of Z, C1, and C2 of said thinned image with every predetermined interval to reduce a number of pixels of said signals Z, C1, and C2, finds said signal V from the pixel-reduced signals Z, C1, and C2 to find the reduced image composed of said signal V, and interpolates and magnifies the found reduced image to find said local signal, the group of values being composed of local average, local median, and other statistical averages of said signals Z, C1 and C2 of said image.

11. The tone-conversion device according to claim 7, wherein a reduction ratio of said reduced image and said image is 1/8 or lower.

12. The tone-conversion device according to claim 7, wherein said neighborhood processing unit performs predetermined filtering on said reduced image, and interpolates and magnifies the filtered reduced image to find said local signal.

13. An electronic camera comprising:
- the tone-conversion device according to claim 1; and
- an image-capturing unit which captures an image of a subject to generate an image, wherein
- a tone of said image generated by said image-capturing unit is converted by said tone-conversion device.

14. A tone-conversion method of converting a tone of an image generated from plural pixels having a signal component including an achromatic signal relating to brightness and a chromatic signal relating to color, said tone-conversion method comprising the steps of:
- extracting said achromatic signal of a first pixel or a second pixel from said plural pixels as an achromatic signal value, the second pixel being in an immediate neighborhood of the first pixel;
- generating a local signal of said first pixel according to said achromatic signal and said chromatic signal of a third pixel contained in a neighborhood area which is larger than said second pixel;
- determining a conversion gain for said signal component of said first pixel according to said achromatic signal value and said local signal; and
- converting said tone by multiplying, by said conversion gain, a signal component of said first pixel or a signal according to the signal component.

15. The tone-conversion method according to claim 14 wherein
said step of determining conversion gain generates a composite signal of said achromatic signal value and said local signal, and determines said conversion gain according to a function of a predetermined gain curve with the composite signal as an input variable.

16. A tone-conversion program stored in a computer for causing the computer to perform the method steps according to claim 14.

* * * * *